US009040190B2

(12) United States Patent
Kim et al.

(10) Patent No.: US 9,040,190 B2
(45) Date of Patent: May 26, 2015

(54) BATTERY PACK

(75) Inventors: Heongsin Kim, Yongin-si (KR);
Seongjoon Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1527 days.

(21) Appl. No.: 11/854,775

(22) Filed: Sep. 13, 2007

(65) Prior Publication Data

US 2008/0081254 A1 Apr. 3, 2008

(30) Foreign Application Priority Data

Sep. 28, 2006 (KR) ........................ 10-2006-0095135

(51) Int. Cl.
*H01M 2/00* (2006.01)
*H01M 2/10* (2006.01)
*H01M 2/02* (2006.01)
*H01M 10/42* (2006.01)

(52) U.S. Cl.
CPC .......... *H01M 2/1061* (2013.01); *H01M 2/0217* (2013.01); *H01M 10/425* (2013.01)

(58) Field of Classification Search
CPC ............................ H01M 2/217; H01M 2/0207
See application file for complete search history.

(56) References Cited

U.S. PATENT DOCUMENTS

| 6,225,778 B1 | 5/2001 | Hayama et al. |
| 2004/0029000 A1 | 2/2004 | Morita et al. |
| 2005/0164080 A1 | 7/2005 | Kozu et al. |
| 2006/0127756 A1 | 6/2006 | Seo |

FOREIGN PATENT DOCUMENTS

| CN | 1281265 A | 1/2001 |
| EP | 1 071 147 A1 | 1/2001 |
| JP | 63-205047 | 8/1988 |
| JP | 2001-093497 A | 4/2001 |
| JP | 2003-234096 | 8/2003 |
| KR | 10-2006-0027618 A | 3/2006 |
| KR | 10-0646528 | 6/2006 |

OTHER PUBLICATIONS

Office action, with English translation, dated Nov. 7, 2008 for corresponding Chinese Patent Application No. 2007101538401 listing the cited reference.
Korean patent abstract for publication No. 1020060059699A dated Jun. 2, 2006 in the name of Kyung Won Seo, corresponding to KR 10-0646528 listed above.
JPO Office Action dated Mar. 29, 2011, for corresponding Japanese Patent Application No. 2006-314507.

*Primary Examiner* — Maria J Laios
(74) *Attorney, Agent, or Firm* — Christie, Parker & Hale, LLP

(57) ABSTRACT

A battery pack, which can secure the strength of an outer case, minimize the thickness over the whole outer case and ensure a battery capacity of the battery pack, by forming a portion of a main wall of the outer case with a metal plate. The battery pack includes a core pack, a first case, and a second case. The first case has a periphery including a first resin molding part, and is configured to cover a first surface of the core pack. The second case has a periphery including a second molding part, and is configured to cover a second surface of the core pack. The first and second cases are connected with each other by a weld of the first and second molding parts.

18 Claims, 10 Drawing Sheets

BATTERY PACK

CROSS-REFERENCE TO RELATED APPLICATION

This application claims priority to and the benefit of Korean Patent Application No. 10-2006-0095135, filed on Sep. 28, 2006, in the Korean Intellectual Property Office, the entire content of which is incorporated herein by reference.

BACKGROUND OF THE INVENTION

1. Field of the Invention

The present invention relates to a battery pack.

2. Description of the Related Art

Generally, unlike a primary battery, a secondary battery is a battery capable of being charged and discharged for several times. The secondary battery manufactured in a shape of a battery pack has been widely used as a power supply for portable electronic devices, such as a cellular phone, a notebook computer, a camcorder, etc.

In particular, among secondary batteries, since a lithium ion secondary battery has a relatively high operational (or working) voltage and a relatively high energy density per part weight, the lithium ion secondary battery is more suitable for the field of portable electronic devices. Further, among lithium ion secondary batteries, since a lithium polymer battery using a polyelectrolyte has shape versatility and flexibility, it can be formed to be relative thin (or slim) to reduce the dimensions of the portable electronic devices.

A conventional battery pack includes a bare cell having an electrode assembly formed by winding a positive electrode plate and a negative electrode plate and a separator interposed between the positive electrode plate and the negative electrode plate, and an inner case in which the wound electrode assembly is sealed while exposing anode and cathode terminals of the electrode assembly. The battery pack is completed by sealing the outer surface of the bare cell with an outer case in a status that a safety device such as a protection circuit board is mounted on an outer surface of the bare cell.

When the battery pack is used as a power supply for portable electronic devices, it is more important to have relatively high structural stability and stiffness than to have relatively high efficiency of the bare cell. Further, the battery pack needs to be relatively slim (or thin) in order to slim and minimize the dimensions of the portable electronic devices. The key to slimming the battery pack is the structure of the outer case forming an exterior shape of the battery pack.

In particular, the thickness of each of the bare cell, protection circuit board and outer case has considerable influence on the slimming of the battery pack. As the capacity of the bare cell is higher, the thickness of the battery pack is increased. Therefore, it is the thickness of the outer case that should be reduced in order to slim the battery pack while maintaining or even increasing the capacity of the battery pack.

However, in the case of a conventional outer case formed with a resin material, it is difficult to have a thin thickness while maintaining the strength thereof. For example, it is difficult to reduce the thickness of each of the front and rear cases forming the outer case to be less than 0.4 mm.

SUMMARY OF THE INVENTION

Aspects of embodiments of the present invention are directed to a battery pack that can minimize the thickness over an outer case while securing the strength of the whole case while maintaining the battery capacity of the battery pack, by forming a portion of a main wall of the outer case with a metal plate Aspects of embodiments of the present invention are directed to a battery pack, which can secure the strength of an outer case and simultaneously minimize the thickness over the whole case, while maintaining (or ensuring) the battery capacity of the battery pack, by forming a portion of a main wall of the outer case with a metal plate.

An embodiment of the present invention provides a battery pack including a core pack, a first case, and a second case. The core pack includes: a pouch type bare cell having an electrode assembly and a pouch case with a cavity configured to receive the electrode assembly, and a protection circuit member arranged at a part of the pouch type bare cell and having an exterior input/output terminal adapted to be electrically connected to the pouch type bare cell. The first case has a periphery including a first resin molding part, and is configured to cover a first surface of the core pack. The second case has a periphery including a second molding part, and is configured to cover a second surface of the core pack. Here, the first and second cases are connected with each other by a weld of the first and second molding parts.

In one embodiment, the pouch case includes a first surface provided with the cavity having a base and four sides, and a second surface covering the cavity.

In one embodiment, the protection circuit member is on the first surface of the core pack.

In one embodiment, the first case includes a first metal plate configured to form at least a first main wall, and the first resin molding part configured to form at least a first sidewall, the first main wall and the first sidewall being configured to surround the first surface of the core pack; and the second case includes a second metal plate configured to form at least a second main wall, and the second resin molding part configured to form at least a second sidewall, the second main wall and the second sidewall being configured to surround the second surface of the core pack.

In one embodiment, the first and second cases are connected with each other by an ultrasonic weld of a first end of the first sidewall and a second end of the second sidewall.

In one embodiment, the first end of the first sidewall includes a first contact surface having a first shape; and the second end of the second sidewall includes a second contact surface having a second shape opposite to the first shape and configured to contact the first contact surface.

In one embodiment, the first and second ends include first and second projection parts formed on the first and second contact surfaces to be engaged with each other.

In one embodiment, the battery pack further includes a welding rib on the first end or the second end.

In one embodiment, a vertical section of the welding rib has a triangle shape.

In one embodiment, an opening is formed on the first resin molding part to correspond to the exterior input/output terminal.

In one embodiment, the base and the four sides meet at a plurality of edges, and at least two facing edges of the plurality of edges are configured to have a rounded shape on the first surface of the pouch case.

In one embodiment, the first metal plate includes: a first plane part having a rectangular shape with dimensions substantially equal to the base formed on the first surface of the pouch case, and being formed to correspond to the base to form a center of first main wall; and a first bent part bent and extended as one body from a periphery of the first plane part to the first surface of the core pack to form a circumferential periphery of the first main wall.

In one embodiment, the first resin molding part includes: a first resin part surrounding the first bent part to form the circumferential periphery of the first main wall; and a second resin vertically bent from the first circumferential periphery of the first main wall to the first surface of the core pack to form the first sidewall.

In one embodiment, the first bent part is provided with an overlapping part configured to overlap with at least one of the facing edges having the rounded shape along a direction from the first surface of the pouch case to the second surface thereof.

In one embodiment, an interior of the first resin part surrounding the first bent part along the shape of the first bent part is configured to have a thickness that does not reach the at least one of the facing edges having the rounded shape of the first surface of the pouch case.

In one embodiment, the first bent part includes a diagonal plane bent from a periphery of the first plane part, and a parallel surface extended from the periphery of the diagonal plane to be parallel with the first plane part.

In one embodiment, the first metal plate includes: a first plane part having a rectangular shape with dimensions substantially equal to the first surface of the core pack except for the protection circuit member, and formed to correspond to the first surface of the core pack except for the protection circuit member to form a center of first main wall; a first bent part bent and extended as one body, from a periphery of the protection circuit member portion of the first plane part to the first surface of the core pack to form a portion of a circumferential periphery of the first main wall; and a vertical bent part vertically bent, as one body, from a periphery of a remaining portion of the first plane part to the first surface of the core pack to form the first sidewall.

In one embodiment, the first resin molding part includes: a first resin part surrounding the first bent part to form a portion of the circumferential periphery of the first main wall; a second resin part vertically bent from a portion of the first circumferential periphery of the first main wall to the first surface of the core pack to form a portion of the first sidewall; and a third resin part surrounding the vertical bent part to form a remaining portion of the first sidewall.

In one embodiment, the vertical bent part is formed on an exterior of a front surface edge of the pouch case.

In one embodiment, the second metal plate includes: a second plane part having a rectangular shape with dimensions substantially equal to the second surface of the core pack, and is configured to correspond to the second surface of the core pack; and a second bent part vertically bent, as one body, from the periphery of the second plane part to the second surface of the core pack.

In one embodiment, the second resin molding part surrounds the second bent part.

In one embodiment, the second bent part is configured on an exterior of a rear surface edge of the pouch case.

In one embodiment, a height of the second bent part ranges from ⅓ to ⅔ of a height formed between the second surface of the pouch case and the base of the first surface of the pouch case.

In one embodiment, the first and second metal plates have a thickness ranging from 0.1 to 0.2 mm.

In one embodiment, the first and second metal plates include stainless steel.

In one embodiment, the first and second resin molding parts include plastic resin.

Another embodiment of the present invention provides a battery pack including a core pack, a first case, and a second case. The core pack includes: a bare cell having an electrode assembly and a case including a cavity configured to receive the electrode assembly, and a protection circuit member arranged at a part of the bare cell and having an exterior input/output terminal adapted to be electrically connected to the bare cell. The first case includes a first metal plate and a first resin molding part at a periphery of the first metal plate, and is configured to cover a first surface of the core pack. The second case includes a second metal plate and a second resin molding part at a periphery of the second metal plate, and is configured to cover a second surface of the core pack. Here, the first and second cases are welded together at the first and second molding parts.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1:
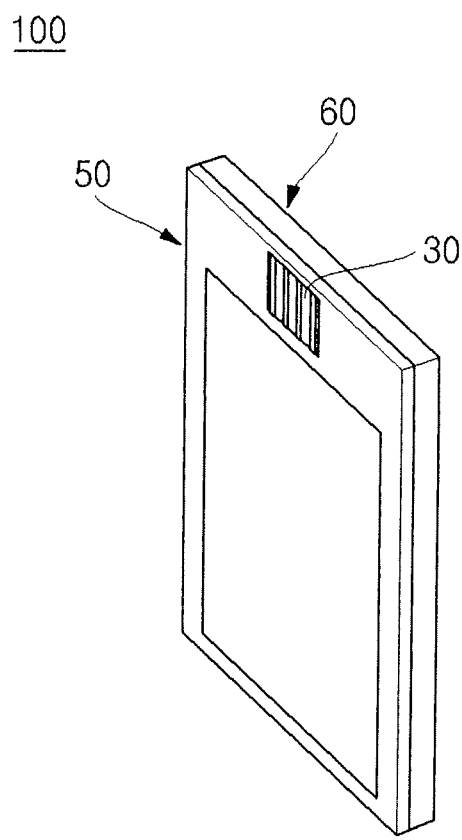
FIG. 1 is a perspective schematic view illustrating a battery pack according to one exemplary embodiment of the present invention.

In the following detailed description, only certain exemplary embodiments of the present invention are shown and described, by way of illustration. As those skilled in the art would recognize, the invention may be embodied in many different forms and should not be construed as being limited to the embodiments set forth herein. In addition, when an element is referred to as being "on" another element, it can be directly on the another element or be indirectly on the another element with one or more intervening elements interposed therebetween. Like reference numerals designate like elements throughout the specification.

Figure 2:
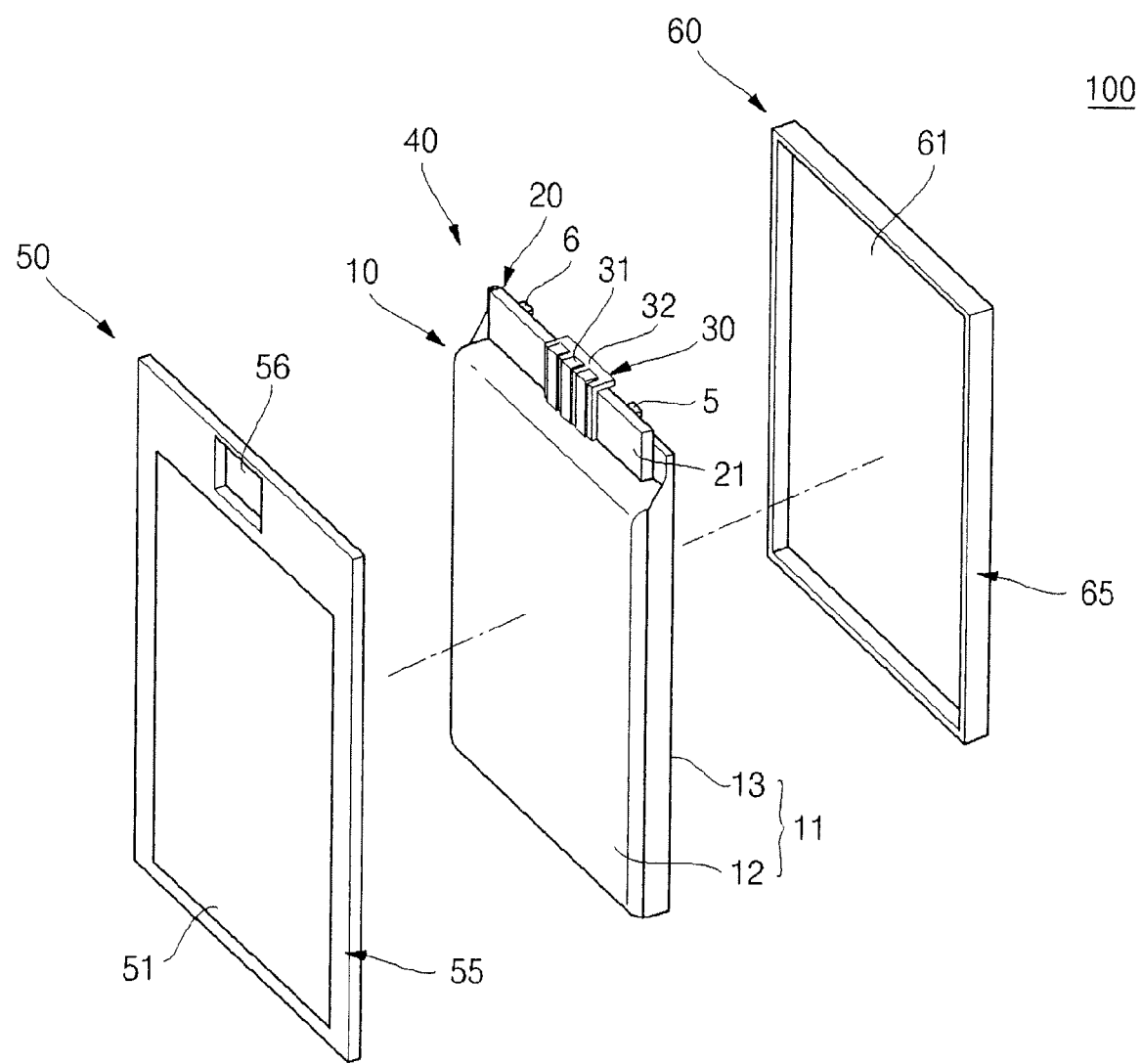
FIG. 2 is an exploded perspective schematic view illustrating the battery pack of FIG. 1.
Figure 3:
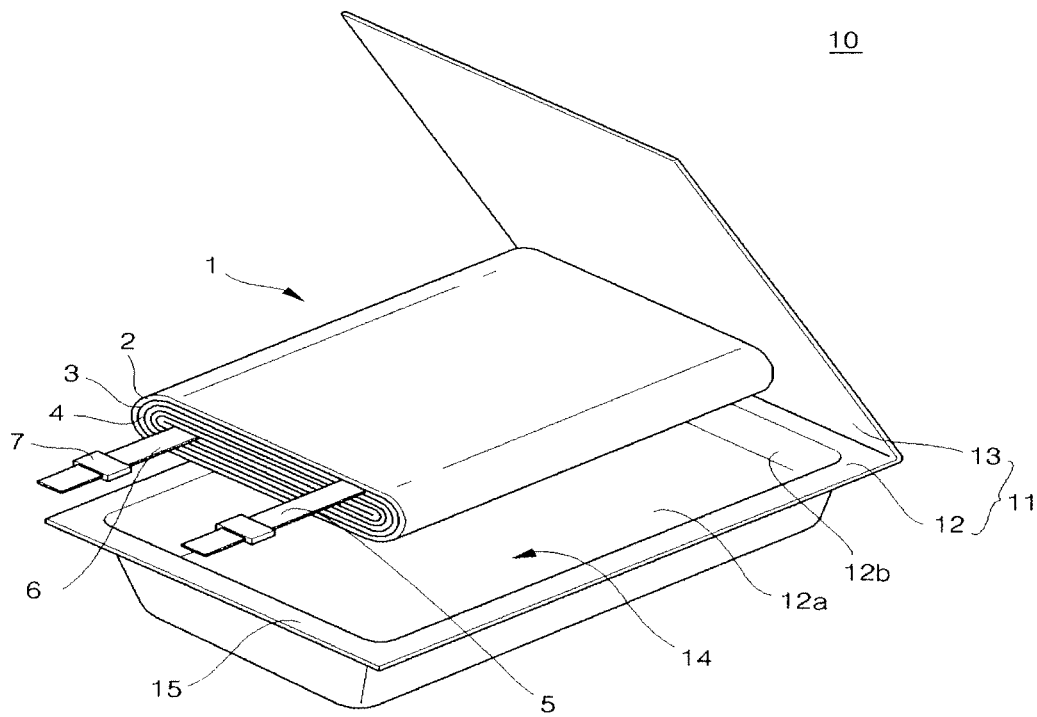
FIG. 3 is a perspective schematic view illustrating a state before a pouch case of a pouch type bare cell of FIG. 1 is sealed.
Figure 4:
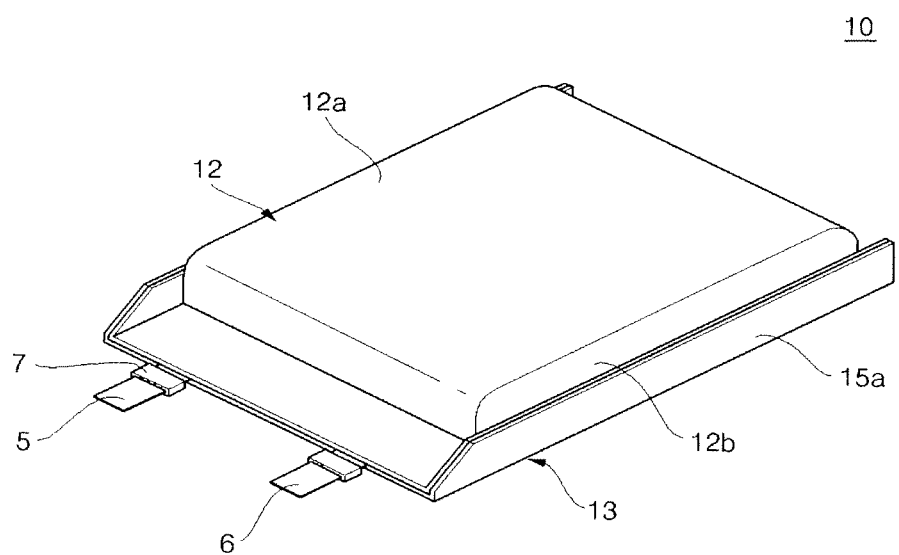
FIG. 4 is a perspective schematic view illustrating a state in which the pouch case of the pouch type bare cell of FIG. 3 is sealed.

FIG. 1 is a perspective schematic view illustrating a battery pack according to an exemplary embodiment of the present invention. FIG. 2 is an exploded perspective schematic view illustrating the battery pack of FIG. 1. FIG. 3 is a perspective schematic view illustrating a state before a pouch case of a pouch type bare cell of FIG. 1 is sealed. FIG. 4 is a perspective schematic view illustrating a state in which the pouch case of the pouch type bare cell of FIG. 3 is sealed.

Referring to FIGS. 1 and 2, a battery pack 100, according to the one embodiment of the present invention, includes a core pack 40 including a pouch type bare cell 10 and a protection circuit member 20 arranged at an upper part of the pouch type bare cell 10 with exterior input/output terminal(s) 30 to electrically connect to the pouch type bare cell 10, a front case 50 for covering the front surface of the core pack 40 where the protection circuit member 20 is placed, and a rear case 60 for covering the rear surface of the core pack 40.

Hereinafter, the pouch type bare cell 10 forming the core pack 40 will be explained with reference to FIGS. 3 and 4.

Referring to FIG. 3, the pouch type bare cell 10 includes an electrode assembly 1 and a pouch case 11 in which the electrode assembly 1 is received.

The electrode assembly 1 includes a positive electrode plate 2 of which both side surfaces are coated with a positive electrode active material, a separator 3, and a negative electrode plate 4 of which both side surfaces are coated with a negative electrode active material.

Further, a positive electrode tap 5 connected with the positive electrode plate 2 is extended from the positive electrode plate 2 by a length (that may be predetermined) to act as a positive electrode, while a negative electrode tap 6 connected with the negative electrode plate 4 is extended from the negative electrode plate 4 by a length (that may be predetermined) to act as a negative electrode. Further, the pouch bare cell 10 includes an electrical insulation tape 7 for preventing (or protecting from) an electrical short between the positive electrode and negative electrode taps 5 and 6 and the pouch case 11. Further, the positive electrode and negative electrode taps 5 and 6 are drawn (or led) outwardly through one side of the pouch case 11 and are electrically connected with the protection circuit member 20 described below. Upper and lower insulation plates are further adhered to the top and bottom of the electrode assembly 1, in order to prevent (or protect) the electrode assembly 1 from contacting with the pouch case 11.

In addition, the direction to which the positive electrode and negative electrode taps 5 and 6 of the pouch type bare cell 10 are drawn (or led) is referred to as an "upward" direction for ease of description, but the present invention is not thereby limited.

The pouch case 11 is composed of a front surface 12 and a rear surface 13 by folding a pouch into half, where the rear surface 13 is connected with the front surface 12. A cavity 14, which receives the electrode assembly 1, is formed on the front surface 12 by a suitable press process. The cavity 14 is defined by a base 12a and four sides 12b of the front surface 12, as illustrated in FIG. 3.

The positive electrode plate 2, the separator 3, and the negative electrode plate 4 are arranged respectively and then wound together in one direction to form the electrode assembly 1 with a jelly-roll structure. The electrode assembly 1 with the jelly-roll structure is placed in the front surface 12 of the pouch case 11 with the cavity 14.

In this case, each end of the positive electrode and negative electrode taps 5 and 6, which are drawn outwardly from each of the electrode plates 2 and 4 of the electrode assembly, is exposed to the exterior of the pouch case 11 which seals portions of the positive electrode and negative electrode taps 5 and 6.

The pouch type bare cell 10 is formed by the steps of: placing the electrode assembly 1; covering the front surface 12 of the pouch case 11 with the rear surface thereof 13; and sealing up the front and rear surfaces 12, 13 of the pouch case 11 by heat welding along the periphery 15 of the cavity 14. The peripheries 15a placed in both side surfaces of the pouch type bare cell 10 are bent at an angle (or a predetermined angle) in order to minimize the width of the pouch type bare cell 10, as illustrated in FIG. 4. In the pouch type bare cell 10, at least two facing edges of edges, where the base 12a and four sides 12b of the front surface 12 forming the cavity 14 meet, are formed to have a rounded shape, as illustrated in FIG. 4, in order to follow the trend in electronic devices featuring a rounded shape exterior.

The exposed taps 5 and 6 are electrically connected with the protection circuit member 20 on the upper part of the pouch type bare cell 10. As described above, the core pack 40 is formed by placing the protection circuit member 20 on the upper part of the pouch type bare cell 10 to electrically connect the protection circuit member 20 to the pouch type bare cell 10. Herein, the protection circuit member 20 is described as being at (or on) the front surface 12 of the pouch case 11, but the present invention is not thereby limited.

The protection circuit member 20 forming the core pack 40 includes a printed circuit board 21. The printed circuit board 21 includes a suitable protection circuit, such as a circuit for maintaining a uniform charge state by controlling the charge and discharge of the battery, and/or a suitable circuit for preventing (or protecting from) overcharge and overdischarge of the core pack 40. In one embodiment, the protection circuit member 20 also includes a suitable protection element, such as a thermistor and/or a thermal fuse, which prevents (or protects from) accidental damage or ignition of the battery by breaking (or blocking) electric current flow when the battery voltage or current is increased over standards by an increase in the battery temperature, an overcharge and/or an overdischarge of the battery, etc.

Further, in one embodiment, the protection circuit member 20 includes the exterior input/output terminals 30 acting as an electrical mediator between the protection circuit member 20 and an external device in order to send/receive electrical signals between the pouch type bare cell 10 and the external device. The exterior input/output terminals 30 include a metal part 31 and a housing part 32 surrounding the metal part 31.

In one embodiment, the metal part 31 is plated with gold (Au), as a conductive material, to achieve an electricity flow between the pouch type bare cell 10 and the external device. The housing part 32 is made with a plastic material as an electrical insulation material, and acts as an electrical insulator for the metal part 31 formed on the housing part 32 at a regular interval.

As described above, the battery pack 100 is obtained by welding of the front case 50 and the rear case 60, with the core pack 40 therebetween, in order to protect the core pack 40 from the exterior.

The front case 50 covers one wide surface, that is, the front surface of the core pack 40 and the periphery thereof is formed of the first resin molding part 55, while the rear case 60 covers another wide surface, that is, the rear surface of the core pack 40 and the periphery thereof is formed of the second resin molding part 65.

The exterior shape of the front case 50 is formed of a box shape of which one side is opened. In an embodiment of the present invention, when the front case 50 covers the core pack 40, the front case 50 part corresponding to the front surface of the core pack 40 is referred to as a first main wall of the front case 50, and the vertical bent part, which is vertically bent from the first main wall with a uniform thickness to cover the core pack 40, is referred to as a first sidewall. The front surface of the core pack 40 is placed in the same direction with the front surface 12 of the pouch case 11.

In the same way, the exterior shape of the rear case 60 is formed of the box shape of which one side is opened. When the rear case 60 covers the core pack 40, the part of the rear case 60 corresponding to the rear surface 13 of the core pack 40 is referred to as a second main wall of the rear case 60, and the vertical bent part, which is vertically bent from the second main wall with a uniform thickness to cover the core pack 40, is referred to as a second sidewall, wherein the rear surface of the core pack 40 is placed in the same direction with the rear surface 13 of the pouch case 11.

Also, the front case 50 is provided with an opening 56 to expose the exposure surface of the exterior input/output terminals 30 to a portion of the first resin molding part 55 that corresponds to the exterior input/output terminals 30, as illustrated in FIG. 2.

Hereinafter, the structure and function of each of the front and the rear cases 50 and 60 covering the core pack 40 will be explained according to FIGS. 5 to 8.

Figure 5:
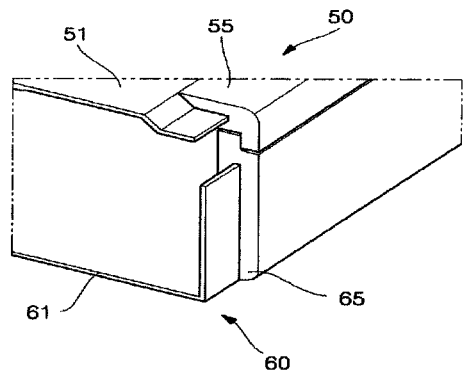
FIG. 5 is a perspective view schematic illustrating a structure adapted to connect a front case with a rear case of FIG. 2.
Figure 6:
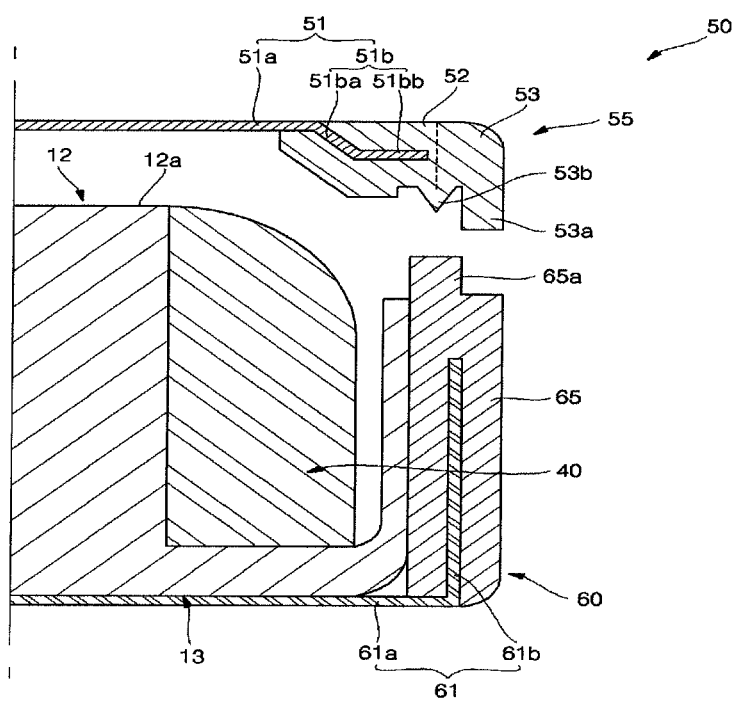
FIG. 6 is a partial cross-sectional schematic view illustrating a state before the front and rear cases are connected with each other, with a core pack of FIG. 2 therebetween.
Figure 7:
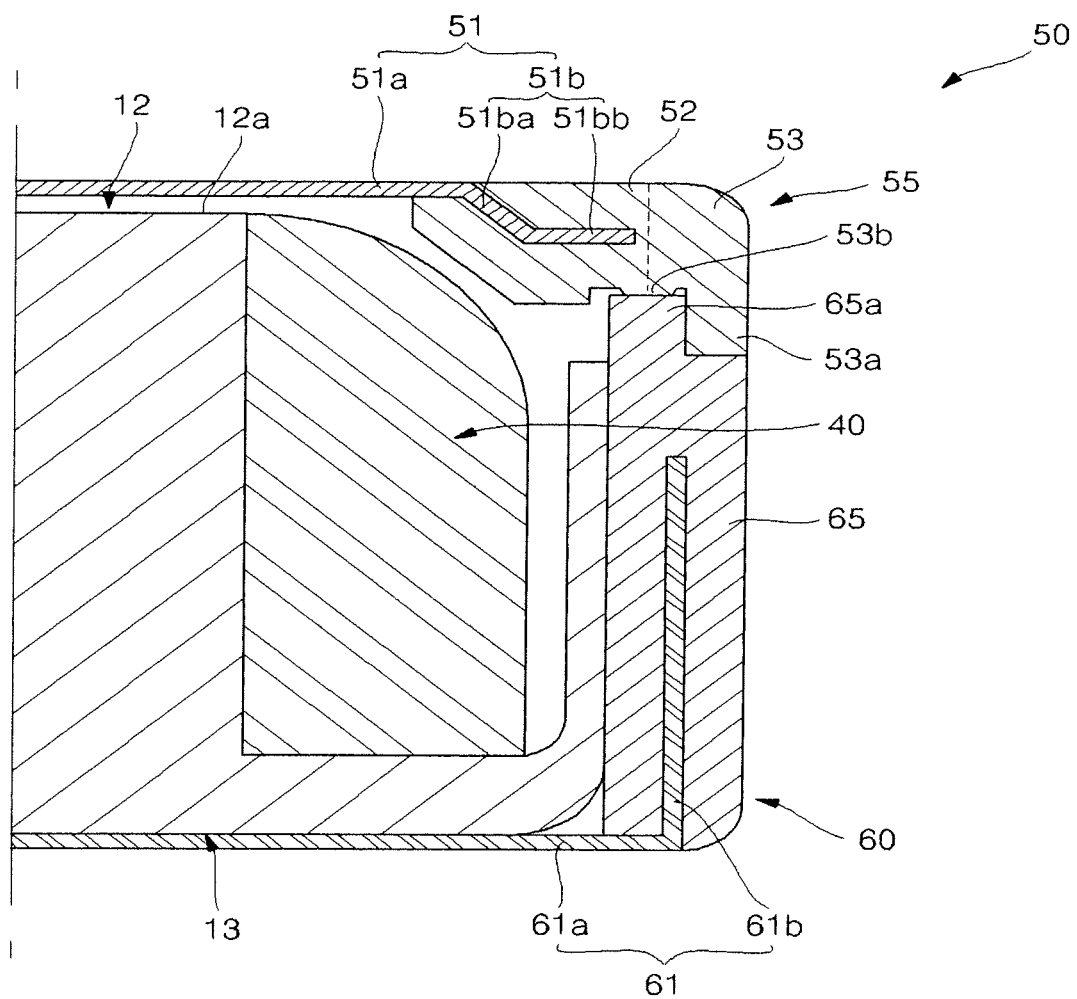
FIG. 7 is a cross-sectional schematic view illustrating a state in which the front and rear cases shown in FIG. 6 are connected with each other.

FIG. 5 is a perspective schematic view illustrating a structure to connect the front with rear cases 50 and 60 of FIG. 2, FIG. 6 is a partial cross-sectional schematic view illustrating a state before the front and rear cases are connected with each other with the core pack of FIG. 2 therebetween, and FIG. 7 is a sectional schematic view illustrating a state in which the front and rear cases of FIG. 6 are connected with each other.

Referring to FIG. 5, the front case 50 of the battery pack 100 according to one embodiment of the present invention includes a first metal plate 51 for forming the first main wall, and the first resin molding part 55 for forming the first sidewall to surround the front surface of the core pack 40 of FIG. 2, while the rear case 60 includes a second metal plate 61 for forming at least the second main wall, and a second resin molding part 65 for forming the second sidewall to surround the rear surface of the core pack 40.

The first metal plate 51 of the front case 50 includes a first plane part 51*a* that forms the center of first main wall and a first bent part 51*b* that is extended, as one body, from the periphery of the first plane part 51*a* and forms the circumferential periphery of the first main wall, as shown in FIG. 6.

The first plane part 51*a* has a rectangular shape with dimensions equivalent to the base 12*a* formed on the front surface 12 of the pouch case and corresponds to the base 12*a* of the front surface 12 of the pouch case when the front case 50 is connected with the front surface of the core pack 40.

The first bent part 51*b* is bent and extended, as one body, from the periphery of the first plane part 51*a* to the front surface of the core pack 40, that is, the front surface 12 of the pouch case, and includes a diagonal plane 51*ba* which is bent from the periphery of the first plane part 51*a*, and a parallel surface 51*bb* which is extended from the periphery of the diagonal plane 51*ba* to be parallel with the first plane part 51*a*. The first bent part 51*b* is placed in the space formed between the front case 50 and the round shaped edge of the front surface 12 of the pouch case, when the front case 50 covers the core pack 40, as illustrated in FIG. 7, so that the interior space of the battery pack can be used. Accordingly, it is possible not to increase the thickness of the total battery pack. The first bent part 51*b* is provided with an overlapping part which overlaps with the round shaped edge, when viewing the rear surface 13 of the pouch case from the front surface 12 thereof after the front case 50 covers the core pack 40.

As described above, the first metal plate 51 is formed with stainless steel, in one embodiment, with Japanese Industrial Standard (JIS) SUS 301, JIS SUS 304, JIS SUS 430 and/or the like which have high tensile strength suitable for an outer case and good corrosion resistance, and has a thickness ranging from about 0.1 to about 0.2 mm. That is, in one embodiment, if the first metal plate 51 has a thickness that is less than 0.1 mm, it is difficult to secure the strength of the front case 50, and if the first metal plate 51 has a thickness that is more than 0.2 mm, the increases in the strength of the front case 50 do not outweigh the increases in the thickness and weight thereof. Further, since the first metal plate 51 having a thickness ranging from 0.1 to 0.2 mm is on the strength level of plastic resin having a thickness of about 0.5 mm, the front case 50 with the first main wall formed therewith the first metal plate 51 can have a thin thickness as well as the desired strength. Accordingly, the battery pack according to one embodiment of the present invention can be thinner and/or stronger than the conventional battery pack formed with only plastic resin.

Referring to FIG. 6, the first resin molding part 55 includes a first resin part 52 for surrounding the first bent part 51*b* and forming the circumferential periphery of the first main wall, and a second resin part 53 that is vertically bent from the first circumferential periphery of the first main wall to the front surface 12 of the pouch case and forms the first sidewall.

The first resin part 52 is formed by surrounding the first bent part 51*b*, which is extended and formed from the first plane part 51*a* of the first metal plate 51, with plastic resin, and supports the first bent part 51*b* of the first metal plate 51, which may not have enough strength to counter against flexure from external forces. The interior of the first resin part 52 surrounding the first bent part 51*b* is formed along the shape of the first bent part 51*b*, and also, when the front case 50 covers the front surface of the core pack 40, is formed to a thickness not reaching to the round shaped edge of the front surface 12 of the pouch case, as illustrated in FIG. 7. In the same (or substantially the same) manner as the first bent part 51*b*, the first resin part 52, which forms the circumferential periphery of the first main wall together with the first bent part 51*b*, is placed in the space formed by the round shape edge of the front surface 12 of the pouch case when the front case 50 covers the core pack 40, thus using the interior of the battery pack to minimize the battery size.

The second resin part 53 is vertically bent and formed from the circumferential periphery of the first main wall to the front surface of the core pack 40, that is, the front surface 12 of the pouch case, in order to cover the core pack 40. Herein, the second resin part 53 is made with a plastic material as the first resin part 52, and the first and second resin parts 52, 53 are formed into one body. A first end of the first sidewall formed with the second resin part 53 is provided with a projection part 53*a* on one side of a contact surface where the first end is joined with a second end of a second sidewall described below.

The first resin molding part 55 of the front case 50, as described above, is formed by surrounding the first bent part 51*b* made with stainless steel and resin, and thus it should be stronger than when it is formed with only resin.

The second metal plate 61 of the rear case 60 includes, as shown in FIG. 6, a second plane part 61*a* which forms the second main wall and a second bent part 61*b* which is extended, as one body, from the periphery of the second plane part 61*a* and forms the second sidewall. The second metal plate 61 is made with the same or substantially the same stainless steel as the first metal plate 51.

The second plane part 61a has a rectangular shape with dimensions equivalent to the rear surface 13 of the pouch case of FIG. 4 and is formed to correspond to the rear surface 13 of the pouch case when the rear case 60 is connected with the rear surface of the core pack 40.

The second bent part 61b is bent and extended, as one body, from the periphery of the second plane part 61a to the rear surface of the core pack 40, that is, the rear surface 13 of the pouch case. The second bent part 61b is formed on the exterior of the rear surface edge of the pouch case and provides the desired strength to protect the core pack 40 from external forces. Herein, the height of the second bent part ranges from 1/3 to 2/3 of the height formed between the rear surface 13 of the pouch case and the base 12a formed to the front surface 12 when the rear case 60 covers the rear surface of the core pack 40. That is, in one embodiment, if the second bent part 61b has a height that is less than 1/3 of the height formed between the rear surface 13 of the pouch case and the base 12a formed to the front surface 12, it is difficult to increase the strength of the second sidewall enough when the second resin molding part 65 described below surrounds the second bent part 61b and forms the second sidewall of the rear case 60, and if the second bent part 61b has a height that is more than 2/3 the height formed between the rear surface 13 of the pouch case and the base 12a formed to the front surface 12, there is a height limit of the resin to surround the second bent part 61b, while the weight of the battery pack is increased by the stainless steel material for the second bent part 61b.

As described above, when the second resin molding part 65 surrounds the second bent part 61b made with stainless steel and forms the second sidewall of the rear case 60, the second bent part 61b increases the strength of the second sidewall, and also improves the connection between the second plane part 61a and the second resin molding part 65.

As described above, the second metal plate 61 has a thickness ranging from 0.1 to 0.2 mm that is the same (or substantially the same or equal) as that of the first metal plate 51. That is, in one embodiment, if the second metal plate has a thickness less than 0.1 mm, it is difficult to secure the strength of the rear case 60, and if the second metal plate 61 has a thickness more than 0.2 mm, the increases in the strength of the rear case 60 do not outweigh the increases in the thickness and weight thereof. Further, as the second metal plate 61 having a thickness ranging from 0.1 to 0.2 mm is on the strength level of plastic resin having a thickness of about 0.5 mm, the rear case 60 having the second main wall formed therewith the second metal plate 61 has a thin thickness as well the desired strength. Accordingly, the battery pack, according to the present invention, can be thinner and/or stronger than the conventional battery pack formed with only plastic resin.

The second resin molding part 65 is formed by surrounding the second bent part 61b with plastic resin and forming the second sidewall together with the second bent part 61b.

A second end of the second sidewall of the rear case 60, as shown in FIG. 6, has a shape opposite to the first end of the first sidewall, and therefore is connected therewith. In an embodiment of the present invention, the first projection part 53a is formed on one side of the first end, and a second projection part 65a is also formed on one side of the second end that corresponds to another side of the first end. When the front and rear cases 50 and 60 are connected with each other, the first and second projection parts, as described above, are engaged with each other and increase the connection thereof.

Further, in order for the front and rear cases 50 and 60 to connect with each other, a welding rib is formed on the end of the front case 50 or the rear case 60. In an embodiment of the present invention, as illustrated on FIG. 6, the welding rib 53b is formed on a portion of the first end of the front case 50. As the vertical section of the welding rib 53b has a triangle shape, it is easy to weld the first end of the first sidewall and the second end of the second sidewall formed on the front case 50 and the rear case 60, respectively, by ultrasonic rays.

The front and rear cases 50 and 60, as illustrated in FIG. 7, are connected with each other by ultrasonic welding, with the core pack 40 therebetween. In this case, the welding rib 53b of the front case 50 is connected with the rear case 60 by ultrasonic welding (or an ultrasonic weld).

As a portion of the main wall of each of the front and rear cases 50 and 60 for covering the core pack 40 is formed with the metal plate having a thickness ranging from 0.1 to 0.2 mm, the battery pack, according to one embodiment of the present invention, reduces the battery pack thickness from 0.3 to 0.2 mm, as compared to the conventional battery pack including a main wall formed with plastic resin having a thickness of about 0.4. Accordingly, as the main wall of each of the front and rear cases 50 and 60 is thinner, an available space is increased and consequently, the battery capacity is increased according to increased available space. Therefore, the battery pack, according to one embodiment of the present invention, can minimize the thickness thereof and simultaneously achieve the high capacity battery pack.

Figure 8:
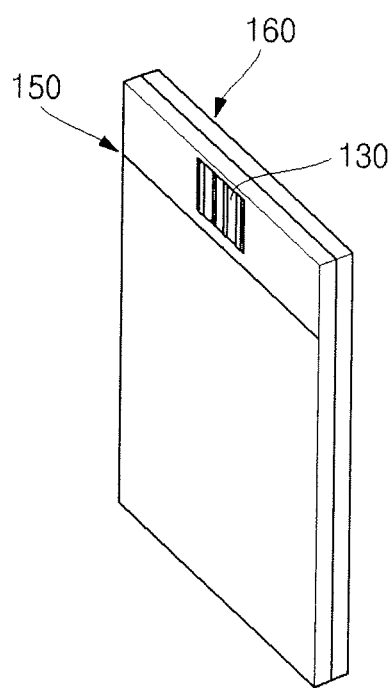
FIG. 8 is a perspective schematic view illustrating a battery pack according to another exemplary embodiment of the present invention.
Figure 9:
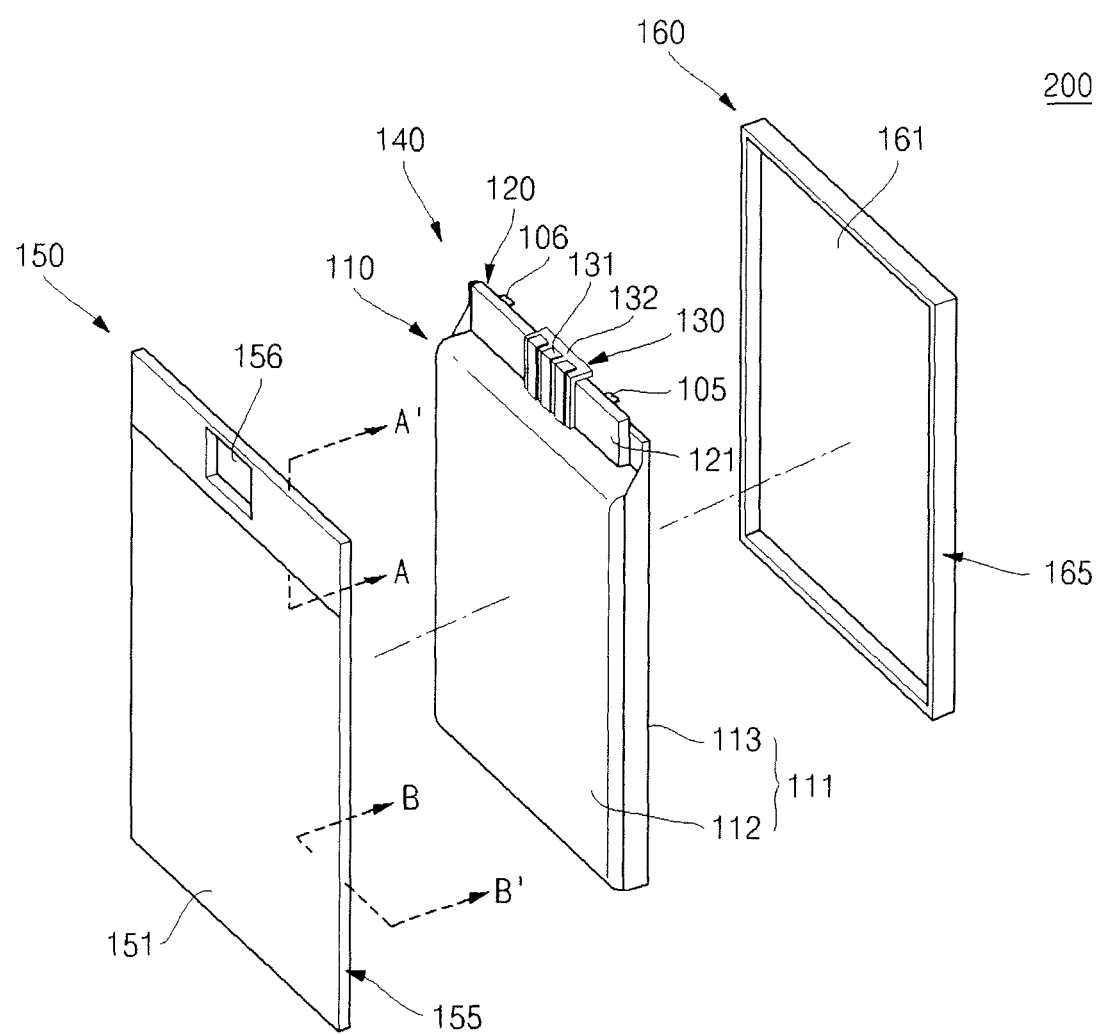
FIG. 9 is an exploded perspective schematic view illustrating the battery pack of FIG. 8.
Figure 10:
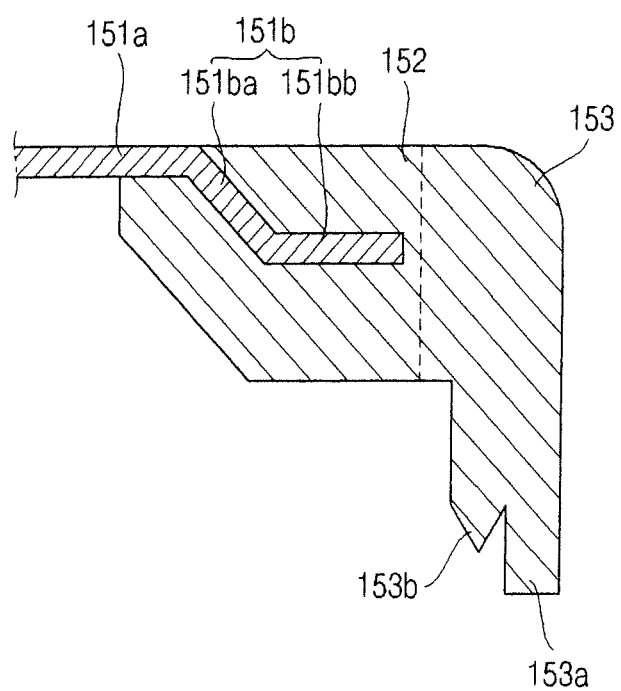
FIG. 10 is a partial cross-sectional schematic view illustrating a front case taken along the line A-A' in FIG. 9.
Figure 11:
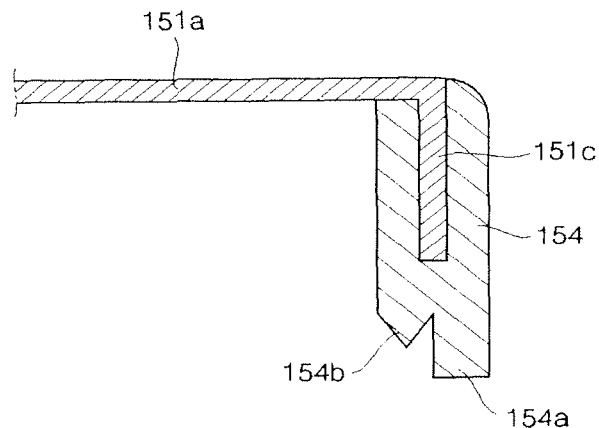
FIG. 11 is a partial cross-sectional schematic view illustrating the front case taken along the line B-B' in FIG. 9.
Figure 12:
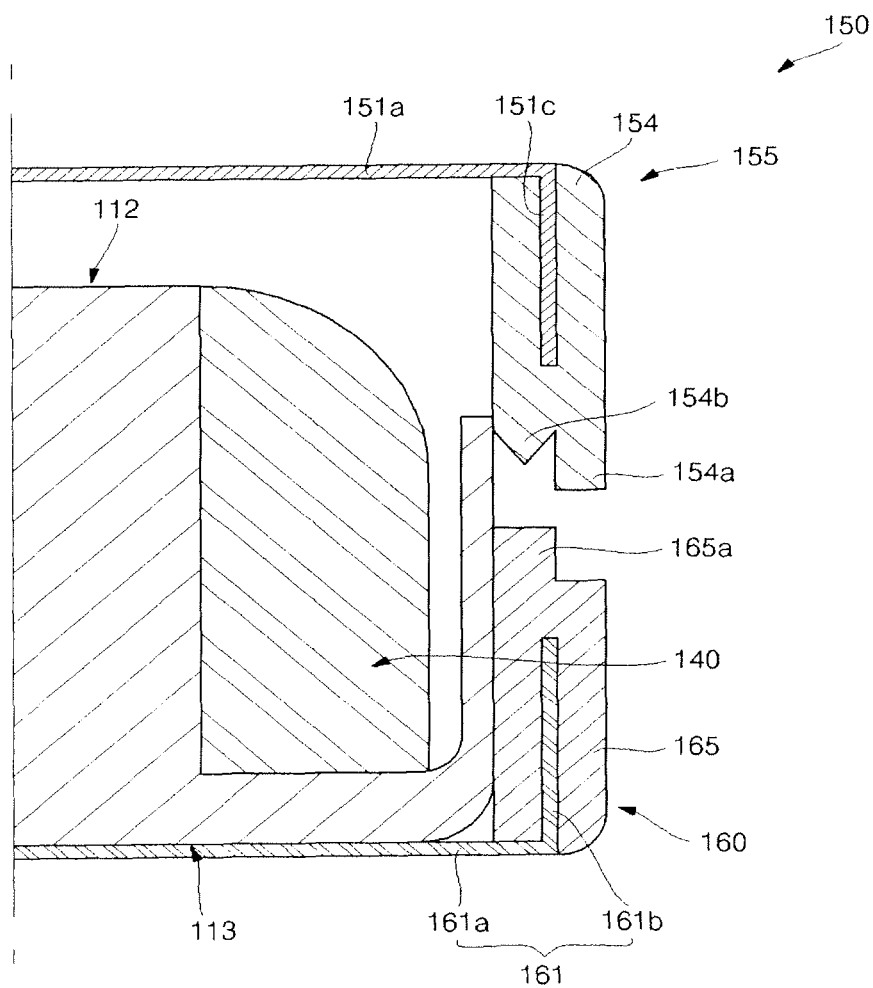
FIG. 12 is a partial cross-sectional schematic view illustrating a state in which the front and rear cases are connected with each other, with a core pack of FIG. 9 therebetween.
Figure 13:
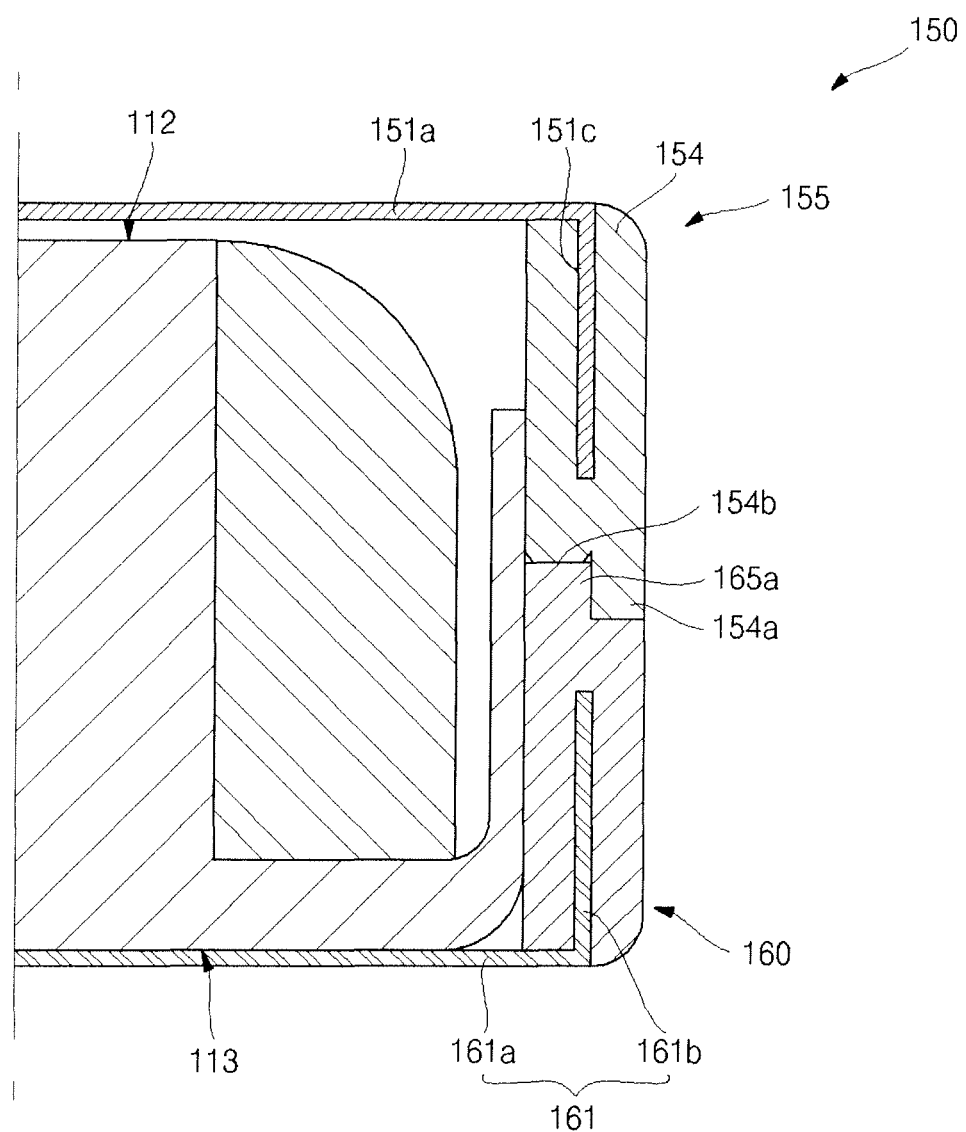
FIG. 13 is a cross-sectional schematic view illustrating a state in which the front and rear cases shown in FIG. 12 are connected with each other.

FIG. 8 is a perspective schematic view illustrating a battery pack according to another embodiment of the present invention, FIG. 9 is an exploded perspective schematic view illustrating the battery pack of FIG. 8, FIG. 10 is a partial cross-sectional schematic view illustrating a front case taken along the line A-A' in FIG. 9, FIG. 11 is a partial cross-sectional schematic view illustrating the front case taken along the line B-B' in FIG. 9, FIG. 12 is a partial cross-sectional schematic view illustrating a state in which the front and rear cases are connected with each other with a core pack of FIG. 9 therebetween, and FIG. 13 is a cross-sectional schematic view illustrating a state in which the front and rear cases of FIG. 12 are connected with each other.

A battery pack 200, according to another embodiment of the present invention, includes elements that are substantially the same as those of battery pack 100 with the exception of the structures of front and rear cases 150 and 160. Therefore, the same or substantially the same elements as the battery pack 100 will not be described again, and only the front and rear cases 150 and 160 will be described in more detail.

The battery pack 200, as shown in FIG. 9 and 10, includes a core pack 140 including a pouch type bare cell 110 and a protection circuit member 120 arranged at an upper part of the pouch type bare cell 110 with an exterior input/output terminal (or terminals) 130 to electrically connect to the pouch type bare cell 110, a front case 150 for covering the front surface of the core pack 140 where the protection circuit member 120 is placed, and a rear case 160 for covering the rear surface of the core pack 140.

The front case 150 of the battery pack 200 includes a first metal plate 151 for forming at least a first main wall and a first resin molding part 155 for forming at least a first sidewall to surround a front surface of the core pack 140, and the rear case 160 includes a second metal plate 161 for forming at least a second main wall and a second resin molding part 165 for forming a second sidewall to surround the rear surface of the core pack 140.

Referring to FIGS. 10 and 11, a first metal plate 151 of the front case 150 includes a first plane part 151a that forms the center of the first main wall, a first bent part 151*b* that is bent and extended from a portion of the periphery of the first plane part 151*a* and forms a portion of the circumferential periphery of the first main wall; and a vertical bent part 151*c* that is bent and extended from the rest of the periphery of the first plane part 151*a* and forms a portion of the first sidewall.

The first plane part 151*a* has a rectangular shape with dimensions equivalent to the front surface of the core pack 140 except the protection circuit member 120 portion of FIG. 9, that is, the front surface 112 of a pouch case 111. The first plane part 151*a* is formed to correspond to the front surface 112 of the pouch case 111 except for the protection circuit member 120 when the front case 150 is connected with the front surface of the core pack 140.

Referring to FIG. 10 taken along the line A-A' in FIG. 9, the first bent part 151*b* is bent and extended, as one body, from the periphery of the protection circuit member 120 portion of the first plane part 151*a* to the front surface of the core pack 140, that is, the front surface 112 of the pouch case 111, and includes a diagonal plane 151*ba* which is bent from the periphery of the first plane part 151*a*, and a parallel surface 151*bb* which is extended, as one body, from the periphery of the diagonal plane 151*ba*, in order to be parallel with the first plane part 151*a*.

Such a first bent part 151*b* has substantially the same structure with the first bent part 51*b* of the front case 50 and also performs substantially the same function therewith, where the first bent part 151*b* is formed only on the upper part of the core pack 140.

The vertical bent part 151*c*, as shown in FIGS. 11 and 12, is vertically bent, as one body, from the rest of the periphery of the first plane part 151*a* to the front surface of the core pack 140, that is, the front surface 112 of the pouch case and forms a portion of the first sidewall. Since such a vertical bent part 151*c* is placed at the exterior of the edge of the pouch case, the vertical bent part 151*c* increases the strength of the first sidewall and also improves the connection between the first plane part 151*a* and the first resin molding part 155.

In the battery pack according to the another embodiment of the present invention, the vertical bent part 151*c* is formed on the position corresponding to the lower part and both side parts of the core pack 140 in the front case 150 and forms a portion of the first sidewall, while the vertical bent part 151*c* is not formed on another portion (or remaining portion) of the first sidewall that corresponds to the upper part of the core pack 140. This is a reason that an opening 156 in order to expose the exposure surface of an input/output terminal 130 is formed at the first main wall corresponding to the upper part of the core pack 140. In other words, if the first plane part 151*a* of the first metal plate 151 is extended to the first main wall corresponding to the upper part of the core pack 140 so as to form the vertical bent part 151*c* at the another portion of the first sidewall corresponding to the upper part of the core pack 140, the opening 156 may not be easily formed at the first main wall corresponding to the upper part of the core pack 140. That is, in one embodiment, the portion of the front case 150 corresponding to the input/output terminal 130 is formed with (or in) resin.

The first metal plate 151, as described above, is made with stainless steel and has a thickness ranging from 0.1 to 0.2 mm that is substantially the same as that of the first metal plate 51. Accordingly, the battery pack, according to the another embodiment of the present invention, can be thinner and/or stronger than the conventional battery pack formed with only plastic resin.

The first resin molding part 155, as shown in FIGS. 10 to 13, includes a first resin part 152 that surrounds the first bent part 151*b* and forms a portion of the circumferential periphery of the first main wall, a second resin part 153 that is vertically bent from the portion of the first circumferential periphery of the first main wall to the front surface of the core pack, that is, the front surface 112 of the pouch case, and a third resin part 154 that surrounds the vertical bent part 151*c* and forms a portion of the first sidewall together therewith.

The first and second resin parts 152 and 153 have the same (or substantially the same or equal) structure as the first and second resin parts 52 and 53, are made with the same (or substantially the same or equal) material with the first and second resin parts 52 and 53, and perform the same (or substantially the same or equal) function therewith. Therefore, the description on the first and second resin parts 152 and 153 will not be provided again in more detail The third resin part 154 surrounds the vertical bent part 151*c* with plastic resin and forms a portion of the first sidewall together therewith.

The first, second and third resin parts 152, 153 and 154 are formed into one body, where the third resin part 154 forming a portion of the first sidewall has a length longer than that of the vertical bent part 151*c* extended from the front case 150 to the front surface of the core pack 140, that is, the front surface 112 of the pouch case. In addition, the second resin part 153 forming another portion of the first sidewall, as shown in FIGS. 10 and 11, has the same (or substantially the same or equal) length as the third resin part 154.

A first end of the first sidewall of the front case 150 as described above is provided with projection parts 153*a*, 154*a* on one side of a contact surface where the first end is joined with a second end of the second sidewall described below. As shown in FIGS. 10 and 11, welding ribs 153*b*, 154*b* are formed on another side of the first end to ease the welding of the end of the first sidewall and the second end of the second sidewall by ultrasonic rays.

In the battery pack according to the another embodiment of the present invention, the connection of the front and rear cases 150, 160 corresponding to the protection circuit member 120 of the core pack 140 is achieved in the same (or substantially the same or equal) manner as that of the front and rear cases 50 and 60 as illustrated in FIGS. 5 and 6. Thus, FIGS. 12 and 13 illustrate the connection of the front and rear cases 150 and 160 corresponding to another portion of the core pack 140.

The first resin molding part 155 of the front case 150, as described above, surrounds the first bent part 151*b* and the vertical bent part 151*c*, which are made with stainless steel and resin, and thus it should be stronger than when it is formed with only resin.

The rear case 160 is the same (or substantially the same or equal) as the rear case 60, except that the height of the second sidewall is reduced according to the height of the first sidewall of the front case 150. That is, the rear case 160 includes a second metal plate 161. The second metal plate 161 includes a second plane part 161*a* which forms the second main wall and a second bent part 161*b* which is extended, as one body, from the periphery of the second plane part 161*a* and forms the second sidewall.

The second plane part 161*a* has a rectangular shape with dimensions equivalent to the rear surface 113 of the pouch case and is formed to correspond to the rear surface 113 of the pouch case when the rear case 160 is connected with the rear surface of the core pack 140.

As described above, when the second resin molding part 165 surrounds the second bent part 161*b* made with stainless steel and forms the second sidewall of the rear case 160, the second bent part 161*b* increases the strength of the second sidewall, and also improves the connection between the second plane part 161a and the second resin molding part 165.

A second end of the second sidewall of the rear case 160 has a shape opposite to the first end of the first sidewall, and therefore is connected therewith. In an embodiment of the present invention, a second projection part 165a is also formed on one side of the second end. When the front and rear cases 150 and 160 are connected with each other, the first and second projection parts, as described above, are engaged with each other and increase the connection thereof.

The front and rear cases 150 and 160, as illustrated in FIG. 13, are connected with each other by ultrasonic welding (or a ultrasonic weld), with the core pack 140 therebetween. In this case, the front and rear cases 150 and 160 are easily connected with each other by ultrasonic welding of the welding rib 154b formed on the first resin molding part 155.

As a portion of the main wall of each of the front and rear cases 150, 160 covering the core pack 140 is formed with the metal plate having a thickness ranging from 0.1 to 0.2 mm, the battery pack, according to the another embodiment of the present invention, reduces the battery pack thickness from 0.3 to 0.2 mm, as compared to the conventional battery pack including a main wall formed with plastic resin having a thickness of about 0.4. Accordingly, as the main wall of each of the front and rear cases 150, 160 is thinner, an available space is increased. Consequently, the battery capacity according to increased available space is increased. Therefore, the battery pack, according to the another embodiment of the present invention, can minimize the thickness thereof and simultaneously achieve the high capacity battery pack.

As described above, a battery pack, according to embodiments of the present invention, produces the following effects.

First, the battery pack, according to the embodiments of the present invention, can secure the strength of its outer case, minimize the thickness over the whole case and ensure (or maintain) the battery capacity, by forming a portion of the main wall of the outer case with a metal plate.

Second, the battery pack, according to the embodiments of the present invention, places a portion of the outer case in the space formed by a pouch bare cell having a rounded shape edge in the interior of the outer case, thereby allowing the battery size to be reduced (or minimized).

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:
1. A battery pack comprising:
 a core pack including:
  a pouch bare cell having an electrode assembly and a pouch case having a cavity configured to receive the electrode assembly, and
  a protection circuit member arranged at a part of the pouch bare cell and having an exterior input/output terminal adapted to be electrically connected to the pouch bare cell;
 a first case having a periphery comprising a first resin molding part, and configured to cover a first surface of the core pack; and
 a second case having a periphery comprising a second resin molding part, and configured to cover a second surface of the core pack,
 wherein the first and second cases are connected with each other by a weld of the first and second molding parts,
 wherein the pouch case comprises a first surface provided with the cavity having a base and four sides, and a second surface covering the cavity,
 wherein the first case comprises a first metal plate configured to form at least a first main wall, and the first resin molding part configured to form at least a first sidewall, the first main wall and the first sidewall being configured to surround the first surface of the core pack, and
 wherein the second case comprises a second metal plate configured to form at least a second main wall, and the second resin molding part configured to form at least a second sidewall, the second main wall and the second sidewall being configured to surround the second surface of the core pack,
 wherein the first metal plate comprises:
 a first plane part having a rectangular shape to form the first main wall; and
 a first bent part bent and extended as one body from a periphery of the first plane part, the first bent part comprising:
  a diagonal plane bent and extended from the periphery of the first plane part in a diagonal direction away from the periphery of the first plane part and away from the core pack; and
  a parallel surface extended from a periphery of the diagonal plane in a direction away from the core pack and parallel to the first plane part,
 wherein the base and the four sides of the pouch case meet at a plurality of edges, and wherein at least two facing edges of the plurality of edges are configured to have a rounded shape on the first surface of the pouch case, the at least two edges having the rounded shape defining a space between the pouch case and the diagonal plane,
 wherein the first resin molding part comprises a first resin part surrounding the first bent part to form a periphery of the first main wall, the first resin part occupying at least a portion of the space between the pouch case and the diagonal plane, and
 wherein the second metal plate comprises a second plane part having a rectangular shape with dimensions substantially equal to the second surface of the core pack, the second plane part being configured to correspond to the second surface of the core pack, the second metal plate further comprising a second bent part vertically bent, as one body, from a periphery of the second plane part, wherein a height of the second bent part ranges from ⅓ to ⅔ of a height formed between the second surface of the pouch case and the base of the first surface of the pouch case.

2. The battery pack of claim 1, wherein the protection circuit member is on the first surface of the core pack.

3. The battery pack of claim 1, wherein the first and second cases are connected with each other by an ultrasonic weld of a first end of the first sidewall and a second end of the second sidewall.

4. The battery pack of claim 3, wherein the first end of the first sidewall comprises a first contact surface having a first shape, and wherein the second end of the second sidewall comprises a second contact surface having a second shape opposite to the first shape and configured to contact the first contact surface.

5. The battery pack of claim 4, wherein the first and second ends comprise first and second projection parts formed on the first and second contact surfaces to be engaged with each other.

6. The battery pack of claim 3, further comprising a welding rib on the first end or the second end.

7. The battery pack of claim 6, wherein a vertical section of the welding rib has a triangle shape.

8. The battery pack of claim 3, wherein an opening is formed on the first resin molding part to correspond to the exterior input/output terminal.

9. The battery pack of claim 3, wherein the first plane part has a dimension substantially equal to the first surface of the core pack except for the protection circuit member, and formed to correspond to the first surface of the core pack except for the protection circuit member to form a center of the first main wall; and the first bent part is bent and extended as one body, from a periphery of the protection circuit member portion of the first plane part to form a portion of a periphery of the first main wall.

10. The battery pack of claim 9, wherein the first resin molding part further comprises:

a second resin part vertically bent from a portion of the periphery of the first main wall to form a portion of the first sidewall; and a third resin part surrounding the vertical bent part to form a remaining portion of the first sidewall.

11. The battery pack of claim 10, wherein the vertical bent part is formed on an exterior of a front surface edge of the pouch case.

12. The battery pack of claim 1, wherein:

the first plane part has a dimension substantially equal to the base formed on the first surface of the pouch case, and being formed to correspond to the base to form a center of the first main wall; and the first bent part bent forms a circumferential periphery of the first main wall.

13. The battery pack of claim 1, wherein the first resin molding part further comprises a second resin part vertically bent from the periphery of the first main wall to form the first sidewall.

14. The battery pack of claim 13, wherein the first bent part is provided with an overlapping part configured to overlap with at least one of the facing edges having the rounded shape along a direction from the first surface of the pouch case to the second surface thereof.

15. The battery pack of claim 14, wherein an interior of the first resin part surrounding the first bent part along the shape of the first bent part is configured to have a thickness that does not reach the at least one of the facing edges having the rounded shape of the first surface of the pouch case.

16. The battery pack of claim 1, wherein the second resin molding part surrounds the second bent part.

17. The battery pack of claim 16, wherein the second bent part is configured on an exterior of a rear surface edge of the pouch case.

18. The battery pack of claim 1, wherein the first and second metal plates have a thickness ranging from 0.1 to 0.2 mm.

* * * * *